(12) United States Patent
Livingston et al.

(10) Patent No.: US 7,038,712 B1
(45) Date of Patent: May 2, 2006

(54) GEOMETRIC AND PHOTOMETRIC CALIBRATION OF CAMERAS

(75) Inventors: Mark A. Livingston, Alexandria, VA (US); Irwin E. Sobel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 623 days.

(21) Appl. No.: 10/124,912

(22) Filed: Apr. 18, 2002

(51) Int. Cl.
*H04N 5/232* (2006.01)
(52) U.S. Cl. .................................... 348/187
(58) Field of Classification Search ............... 348/180, 348/187, 181, 188; 358/504
See application file for complete search history.

(56) References Cited

U.S. PATENT DOCUMENTS

| | | | | |
|---|---|---|---|---|
| 4,866,644 A | * | 9/1989 | Shenk et al. ............... | 356/319 |
| 5,729,471 A | * | 3/1998 | Jain et al. .................. | 725/131 |
| 5,745,126 A | * | 4/1998 | Jain et al. .................. | 382/154 |
| 5,821,993 A | * | 10/1998 | Robinson .................... | 348/187 |
| 6,016,161 A | * | 1/2000 | Robinson .................... | 348/187 |
| 6,271,855 B1 | * | 8/2001 | Shum et al. ................. | 345/427 |
| 6,437,823 B1 | * | 8/2002 | Zhang ........................ | 348/187 |
| 6,788,333 B1 | * | 9/2004 | Uyttendaele et al. ......... | 348/36 |
| 2004/0247174 A1 | * | 12/2004 | Lyons et al. ................ | 382/154 |

OTHER PUBLICATIONS

Kang and Szeliski; 3-D Data Recovery using Omnidirctional Multibaseline Stereo; Cambridge Research Laboratory Tech Report, Oct. 1995.

* cited by examiner

*Primary Examiner*—Paulos M. Natnael

(57) ABSTRACT

A method for calibrating a camera including determining a model for associating a point of an image scene to a point of an imaging surface of the camera. The calibration method further includes determining a set of initial estimates for a set of parameters of the model and then refining the parameters in response to a set of image data of the image scene acquired by the camera.

9 Claims, 3 Drawing Sheets

Determine a Model that Associates a Point in the Image Scene to a Point on a Surface of the Imaging Array
100

Determine Initial Estimates for Parameters of the Model
102

Refine the Parameters Using Image Data Acquired by the Camera
104

GEOMETRIC AND PHOTOMETRIC CALIBRATION OF CAMERAS

BACKGROUND OF THE INVENTION

1. Field of Invention

The present invention pertains to the field of imaging. More particularly, this invention relates to geometric and photometric calibration of cameras.

2. Art Background

It is often desirable in imaging systems to determine the 3D geometry of an image scene using 2D photographs of the image scene. A determination of 3D geometry of an image scene enables the automatic modeling of images scenes and may be employed in a variety of applications in entertainment, including the modeling of large-scale movie sets, real estate, architecture, and mechanical design, to name a few example applications.

The determination of 3D geometry of an image scene from 2D photographs usually includes determining a geometric model for the camera. A geometric model for a camera typically indicates where a point in a 3D image scene appears on an imaging surface of the camera. A geometric model usually includes a set of intrinsic parameters of the camera. The intrinsic parameters of a camera are usually associated with a projection of a 3D image scene onto the 2D imaging surface of the camera.

The process of determining a geometric model for a camera including its parameters is commonly referred to as camera calibration. The calibration process if effective usually enables the accurate projection of a point in the image scene onto the imaging surface of the camera.

SUMMARY OF THE INVENTION

A method for calibrating a camera is disclosed. The present calibration method includes determining a model for associating a point of an image scene to a point of an imaging surface of the camera. The model has a set of parameters associated with the camera. The calibration method further includes determining a set of initial estimates for the parameters and then refining the parameters in response to a set of image data of the image scene acquired by the camera.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
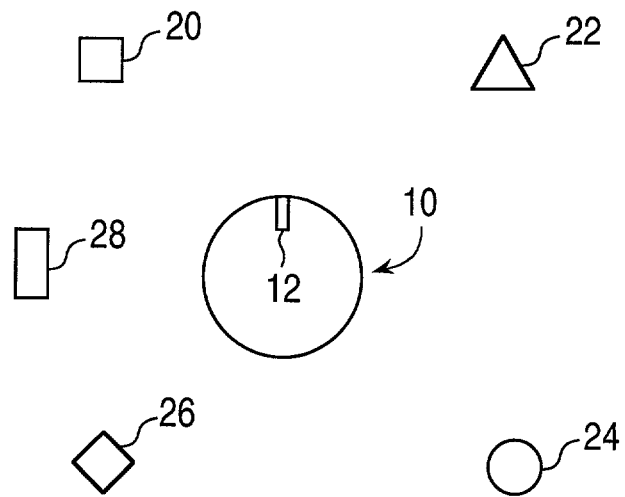
FIG. 1 shows a top view of a camera which photographs an image scene that includes a set of objects.

FIG. 1 shows a top view of a camera 10 which photographs an image scene that includes a set of objects 20–28. In one embodiment, the camera 10 is a cylindrical panoramic camera having a rotating imaging array 12. A cylindrical panoramic camera usually increases the amount of information in each photograph, thereby reducing the number of photographs needed to reconstruct a given image scene.

Figure 2:
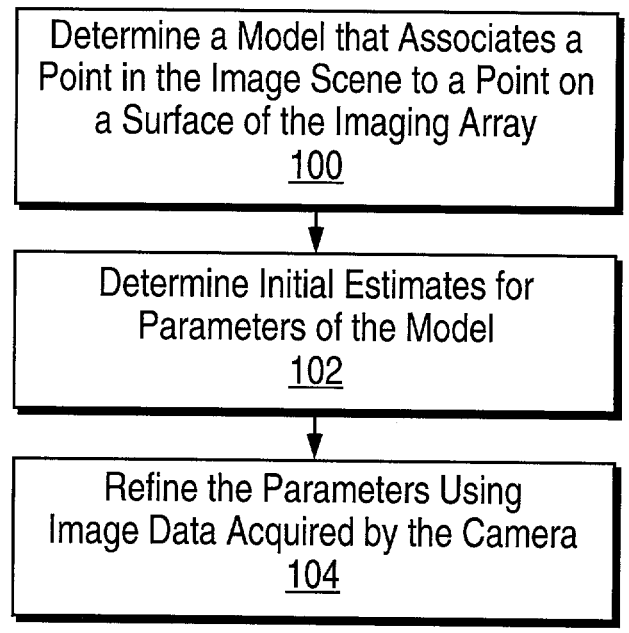
FIG. 2 shows a method for calibrating a camera according to the present teachings.

FIG. 2 shows a method for calibrating the camera 10. At step 100, a model for associating a point of an image scene to a point of a surface of the imaging array 12 is determined. The model yielded by step 100 includes a set of parameters associated with the camera 10. The parameters of the model may include a set of intrinsic parameters of the camera 10.

The intrinsic parameters of the camera 10 may include the focal length, the aspect ratio of a pixel (ratio of width to height), the skew of the image (deviation from orthogonality in the basis axes), and the location of the principal point of the lens of the camera 10 with respect to the image.

In addition, the parameters may include distortion parameters that describe the bending of the incoming light from true pinhole perspective projection.

At step 102, a set of initial estimates for the parameters of the model are determined. The initial estimates for the intrinsic parameters may be derived from specifications provided by the manufacturer of the camera 10—for example the focal length of the lens, image vertical center at half the number of pixels, eccentricity, skew, and distortion at zero.

At step 104, the parameters for the model are refined in response to a set of image data of the image scene acquired by the camera 10. In one embodiment, the refinement step includes optimization of a cost function for the parameters. A photometric correction function may be applied to the image data when refining the parameters.

The model including refined parameters yielded by the above process is a model of where points associated with the objects 20–28 will appear on the imaging surface of the camera 10. The model may be used in many subsequent methods for scene reconstruction, i.e. methods for computing the 3D geometric shape of the objects 20–28 photographed with the camera 10. Many of these methods rely on camera calibration to yield sufficient information for precise computation of 3D geometric structure.

The process of calibrating the camera 10 set forth herein yields a geometric model that describes the image formation process of the camera 10 and a method for measuring the parameters in that model.

A process of 3D imaging includes transforming all points from the world-space coordinate system to a camera-centric coordinate system, which has a six degree-of-freedom (DOF) offset from the world coordinate system. Camera-centric coordinates are calculated in response to the world-space representation of the point and the extrinsic parameters of the camera 10, which are embodied in rotation and a translation.

Figure 3:
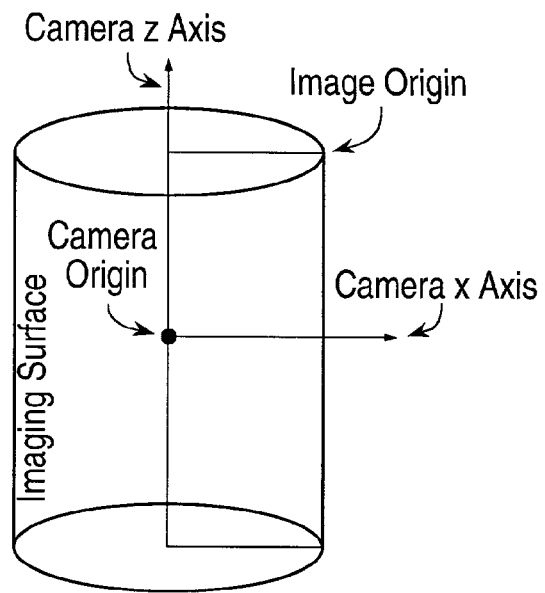
FIG. 3 is a diagram of a camera-centric coordinate system for a cylindrical panoramic camera.

FIG. 3 is a diagram of a camera-centric coordinate system for the camera 10. The camera y axis is not shown but may be derived by the right-hand rule. The image coordinate origin is a the top of the cylinder and has a y coordinate of 0.0.

Once a world-space point is expressed in camera-centric coordinates, its image-plane location is then computed. This aspect of 3D imaging is performed with a set of intrinsic parameters of the camera 10 that describe the projection of the 3D world containing the objects 20–28 onto the 2D imaging surface, in one embodiment the imaging array 12, of the camera 10. The process of calibration determines appropriate values for these parameters based on a model for a cylindrical panoramic camera.

Figure 4:
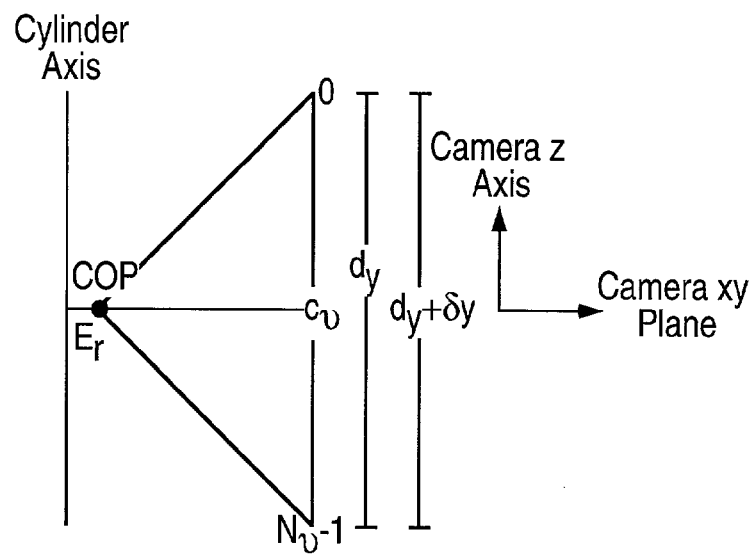
FIG. 4 is a typical perspective projection arrangement for a panoramic camera applied to the vertical component of its cylindrical imaging system.

FIG. 4 is a typical perspective projection arrangement for the camera 10 applied to the vertical component of its cylindrical imaging system. In an embodiment in which the camera 10 has a linear CCD imaging array, the single-parameter "radial" distortion model is restricted to vertical distance. The pixels are numbered from 0 at the top to $N_v-1$ at the bottom.

Figure 5:
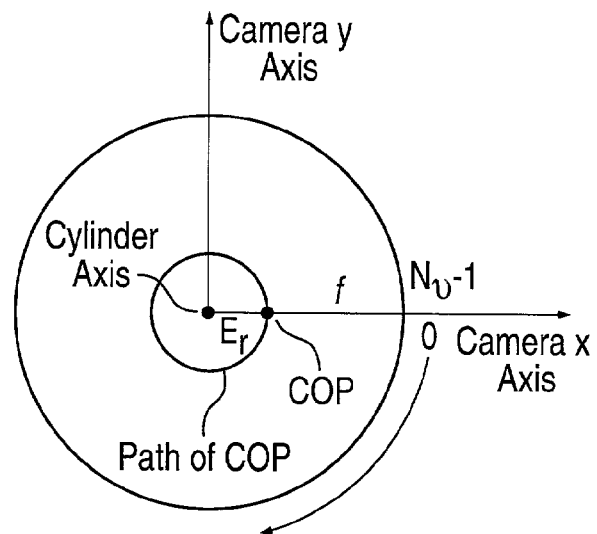
FIG. 5 illustrates the imaging geometry in the horizontal direction of the cylinder of a cylindrical panoramic camera.

FIG. 5 illustrates the imaging geometry in the horizontal direction of the cylinder of the camera 10. The quantities f and $E_r$ are intrinsic parameters of the camera 10 that are determined during calibration. The other quantities may be provided by the manufacturing specifications of the camera 10. The pixels are numbered from 0 to $N_v-1$, with the camera x axis intersecting the border of the first and the last pixels.

Images acquired with the camera 10 take place within the camera-centric coordinate system shown in FIG. 3. For each location of the camera 10, the position and orientation of the camera-centric system is measured with respect to the global coordinate system. Pixel coordinates (u, v) are calculated from the world-space point $[x_w\ y_w\ z_w]^T$ with the following set of equations based on the geometry shown in FIGS. 3–5.

$$\begin{bmatrix} x \\ y \\ z \end{bmatrix} = [R\,|\,-Rt] \begin{bmatrix} x_w \\ y_w \\ z_w \\ 1 \end{bmatrix}$$

The vertical component uses the standard perspective projection equations with focal length f, image center $C_v$, image height in pixels $N_v$, and image $$v_n = \frac{f \cdot z}{d_y\left(\sqrt{x^2+y^2} - E_r\right)}$$

$$v = C_v - v_n \cdot (1+kv_n^2) \cdot N_v$$

$$u_n = \frac{\arctan\left(\frac{y}{x}\right)}{2\Pi}$$

$$u = N_u - (u_n + \sigma v_n) N_u$$

height in millimeters $d_y$. The distance is expressed as distance in the xy-plane, and the height is the z coordinate. A single-parameter (denoted k) radial lens distortion model is used, but since the imaging device in the camera 10 in one embodiment is a linear CCD, the "radial" distance is the vertical distance from the center. The vertical field of view in one embodiment of the camera 10 is approximately 78 degrees and every pixel is in the horizontal center of the field of view. As a consequence, one radial term may be a sufficient model for distortion.

The rotating head of the camera 10 enables its imaging array 12 to acquire the same type of image at every step around the cylinder. The basic trigonometry determines the horizontal image coordinate using the number of pixels $N_u$ around the cylinder. The cylinder skew σ is non-zero when the imaging array 12 is not parallel to the cylinder axis. The cylinder skew leans along the direction of the (positive or negative) horizontal tangent to the cylinder.

Eccentricity $E_r$ accounts for the fact that the lens of the camera 10 may not be mounted on the camera/tripod assembly such that the center of projection lies on the cylinder axis. This is shown in FIGS. 4–5 with the center of projection offset from the axis in the imaging direction ($E_r>0$) but the offset could occur in the opposite direction ($E_r<0$).

In some embodiments, a parameter that accounts for an angular difference between the direction of the rays and the cylinder normal is not included in the calculations. Such a parameter as well as the skew parameters may be negligible.

Given the imaging geometry set forth above, the task of determining the parameters of the model is as follows. In one embodiment, three camera constants are used as inputs—the number of pixels horizontally ($N_u$), the number of pixels vertically ($N_v$), the height of the imaging array in millimeters ($d_y$).

A set of five intrinsic parameters are generated as output—the focal length (f), the vertical image center pixel ($C_v$), the eccentricity ($E_r$), the radial distortion parameter (k), and the cylinder skew parameter σ. The five intrinsic parameters may be the same for all images.

For each image, six extrinsic parameters are determined—three rotation DOFs and three translation DOFs. The initial estimates for the intrinsic parameters may be derived from specifications provided by the manufacturer of the camera—for example the focal length of the lens, image vertical center at half the number of pixels, eccentricity, skew, and distortion at zero.

An essential matrix method as adapted to cylindrical images is used to compute an initial estimate for the extrinsic parameters of the second and succeeding cylinders. The first cylinder is assigned an orientation coincident with the world orientation and at the world origin.

The calibration process takes as input the 2D coordinates of corresponding points in some number of the input images. The correspondences may be specified manually or by employing an automatic tracking process.

The constraint equation for cylindrical images obtained with the camera 10 and converted to the imaging geometry set forth above is as follows.

$$[u',\ v',\ w']E \begin{bmatrix} x \\ y \\ z \end{bmatrix} = \vec{0}$$

where $$\begin{bmatrix} u \\ v \\ w \end{bmatrix} = \begin{bmatrix} f\cos(2\Pi u_n) \\ -f\sin(2\Pi u_n) \\ v_n \end{bmatrix}$$

and similarly for the corresponding (primed) point. The vector $[u, v, w]^T$ may be normalized to reduce the sensitivity of the constraint matrix. The resulting linear system is solved for the elements of E. This procedure may be wrapped inside a random sample consensus to identify outliers in the correspondence data. This assumes that sufficient inliers are available for a minimal solution and that those points will constitute at least one sample set in the random sample consensus procedure.

A number of methods may be employed to decompose E into a rotation and translation that would yield the given essential matrix. These may be determined using the singular value decomposition (SVD) of the essential matrix, $E=U\Sigma V^T$. The direction of translation is given to within a sign by the left singular vector in the column of U associated with the smallest singular value (which should be zero, since the essential matrix is rank-2). Independent of the correct sign, the rotation is given by either $UWV^T$ or $UW^TV^T$, where $$W = \begin{bmatrix} 0 & -1 & 0 \\ 1 & 0 & 0 \\ 0 & 0 & 1 \end{bmatrix}$$

One of these four possibilities will reconstruct the points in front of both cameras. This decomposition may not successfully identify any solution as reasonable for some matrices and SVDs. The problem may result from the fact that the essential matrix has one unique singular value, and thus a family of SVDs. Using the Numerical Recipes SVD computation yield matrices that have U and V matrices with determinants of −1. The matrix W may be parameterized with the signs of the determinants:

$$W = \begin{bmatrix} 0 & 1 & 0 \\ -1 & 0 & 0 \\ 0 & 0 & \det(V)\cdot\det(U) \end{bmatrix}$$

This method may be adapted to the cylindrical camera 10 by forcing the signs of the determinants to be +1 by negating the entire matrix U or V (or both) when the respective determinants are −1. This is equivalent to the original formulation if the determinants of U and V have the same sign, and equivalent to negating W when the signs of the two determinants differ. This yields a reasonable decomposition image pairs.

For a cylindrical panoramic camera, the rays from camera j to point i and from camera k to point i may be written in the canonical spaces of the cameras and then transformed to world space via the extrinsic parameters of the cameras to yield the following constraint.

$$(T_k-T_j)\cdot(R_j^T\text{Ray}(u_{ij}, v_{ij})\times R_k^T\text{Ray}(u_{ik}, v_{ik}))=0$$

where $$\text{Ray}(u_{ij}, v_{ij}) = \begin{bmatrix} a_{ij} \\ b_{ij} \\ c_{ij} \end{bmatrix} = \begin{bmatrix} \cos(2\Pi u_{ij}/N_{u_j}) \\ -\sin(2\Pi u_{ij}/N_{u_j}) \\ (C_{v_j} - v_{ij})d_y/N_{v_j} \end{bmatrix}$$

is the ray in the coordinate system of the camera 10 and $(u_{ij}, v_{ij})$ is the measured image coordinate of the correspondence. Each constraint equation may be written as follows.

$$\begin{bmatrix} -b_{ij}c_{ik} \\ -a_{ik}c_{ij} \\ -b_{ik}c_{ij} \\ -a_{ij}c_{ik} \end{bmatrix} \begin{bmatrix} T_{j,x} \\ -T_{k,x}\sin\alpha_k + T_{k,y}\cos\alpha_k \\ T_{k,x}\cos\alpha_k + T_{k,y}\sin\alpha_k \\ T_{k,y} \end{bmatrix} = 0$$

Parameter refinement may be performed as follows. Starting with the initial estimate, all extrinsic and intrinsic parameters are refined using the co-planarity constraint described above. The cost function for each image of a point seen in a pair of images is the distance from the epipolar plane.

$$\text{Cost}(i, j, k)=(T_k-T_j)\cdot(R_j^T\text{Ray}(u_{ij}, v_{ij})\times R_k^T\text{Ray}(u_{ik}, v_{ik}))$$

$$\Sigma_{i, j, k}=w_i(\text{Cost}(i, j, k))^2$$

The above sum (equation 1) is taken over all points i and all cylinders j and k that see point i, subject to j<k. Thus each unique point-cylinder-cylinder tuple contributes only once to the error computation. In addition, $w_i$ is a weighting factor. Each distance is squared and weighted by the angle between the baseline used for triangulation and the ray emanating from the first cylinder.

$$w_i=1-\cos\phi$$

The "first" is chosen as the cylinder with the lower identification number of the two, and the ID numbers are assigned in the order in which the cylinders were acquired. Triangulation is well-known in computer vision to be numerically sensitive. This weighting function which may be integrated into an output of the cost function decreases the importance of correspondences for which the two lines of sight are nearly parallel to the baseline used for triangulation, which is a configuration that is numerically unstable. Powell's multi-dimensional optimization method may be employed with an exhaustive 1D search in the inner loop. This method does require numerous function evaluations and thus is computationally expensive, but it is unlikely to get caught in a local minimum that is not the global minimum.

Photometric correction may be addressed on the assumption that all surfaces are diffuse. The rotating-head the camera 10 in one embodiment consumes approximately 90 seconds to capture a panorama with about 30 degrees of overlap. It is desirable to shoot an image when few non-static objects (e.g. people and strong shadows) are in the environment. On the other hand, it is also desirable to have constant illumination when shooting an image. One solution is to acquire images in the early morning and provide a software correction for illumination change and to acquire multiple panoramas from a single location in order to paint out any non-static elements.

Figure 6:
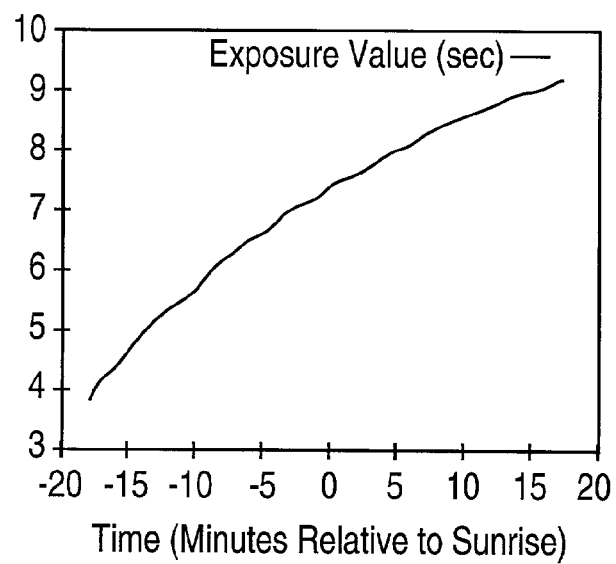
FIG. 6 shows light meter readings during the time of a panorama acquisition using a cylindrical panoramic camera near sunrise.

FIG. 6 shows light meter readings during the time of a panorama acquisition using the camera 10 near sunrise. The horizontal axis indicates time relative to sunrise. This graph yields adjustments to the exposure value between photographs and uses the following linear brightness correction function within a single panorama.

$$\text{mask}_i(\lambda) = 1 + \lambda \cdot \frac{(N_u - 1 - i) \% N_u}{N_u}$$

where % indicates the modulus operator. The correction is performed on each color channel and clamped to the appropriate range. The variable i indicates the horizontal pixel coordinate and ranges from 0 to $N_u-1$. The parameter $\lambda$ may be experimentally determined and in one implementation is 0.87 for an example set of data.

Lens vignetting results in inconsistent colors for surfaces near the camera positions. To correct vignetting, a tangent-squared correction is applied as follows.

$$mask_j(\Upsilon) = 1 + \left(\frac{1}{\Upsilon} - 1\right) \cdot \tan^2\left(\frac{2j}{N_v} - 1\right)$$

Each channel is corrected separately and clamped. The variable j indicates the vertical pixel coordinate and ranges from 0 to $N_v-1$. The parameter $\gamma$ may be experimentally determined and in one implementation is 0.61 for an example set of data.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for calibrating a camera, comprising:
   determining a model for associating a point of an image scene to a point of an imaging surface of the camera, the model having a set of parameters associated with the camera;
   determining a set of initial estimates for the parameters;
   refining the parameters in response to a set of image data of the image scene acquired by the camera wherein refining the parameters includes optimizing a cost function for the parameters.

2. The method of claim 1, further comprising integrating a weighting function into an output of the cost function.

3. A method for calibrating a camera, comprising:
   determining a model for associating a point of an image scene to a point of an imaging surface of the camera, the model having a set of parameters associated with the camera;
   determining a set of initial estimates for the parameters;
   refining the parameters in response to a set of image data of the image scene acquired by the camera further comprising applying a photometric correction function to the image data.

4. The method of claim 3, wherein applying a photometric correction function to the image data includes applying a linear correction function to the image data.

5. A method for calibrating a camera, comprising:
   determining a model for associating a point of an image scene to a point of an imaging surface of the camera, the model having a set of parameters associated with the camera;
   determining a set of initial estimates for the parameters;
   refining the parameters in response to a set of image data of the image scene acquired by the camera;
   applying a photometric correction function to the image data including correcting for lens vignetting of the camera.

6. The method of claim 5, wherein correcting for lens vignetting includes applying a tangent-squared correction to the image data.

7. A method for calibrating a camera, comprising:
   determining a model for associating a point of an image scene to a point of an imaging surface of the camera, the model having a set of parameters associated with the camera;
   determining a set of initial estimates for the parameters;
   refining the parameters in response to a set of image data of the image scene acquired by the camera wherein determining a set of initial estimates for the parameters includes determining a set of initial estimates for a set of intrinsic parameters of the camera in response to manufacturing specifications of the camera.

8. A method for calibrating a camera, comprising:
   determining a model for associating a point of an image scene to a point of an imaging surface of the camera, the model having a set of parameters associated with the camera;
   determining a set of initial estimates for the parameters;
   refining the parameters in response to a set of image data of the image scene acquired by the camera wherein the camera is a cylindrical panoramic camera.

9. The method of claim 8, wherein the cylindrical panoramic camera includes a linear imaging array.

* * * * *